US012149770B2

(12) United States Patent
Matsunaga et al.

(10) Patent No.: US 12,149,770 B2
(45) Date of Patent: Nov. 19, 2024

(54) INFORMATION PROCESSING APPARATUS, DISPLAY ELEMENT DISPLAY METHOD, AND MANAGEMENT SERVER

(71) Applicant: Sony Interactive Entertainment Inc., Tokyo (JP)

(72) Inventors: Kiyobumi Matsunaga, Tokyo (JP); Masaki Takase, Tokyo (JP); Masahiro Fujihara, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 18 days.

(21) Appl. No.: 18/005,075

(22) PCT Filed: Jul. 19, 2021

(86) PCT No.: PCT/JP2021/026977
§ 371 (c)(1),
(2) Date: Jan. 11, 2023

(87) PCT Pub. No.: WO2022/019269
PCT Pub. Date: Jan. 27, 2022

(65) Prior Publication Data
US 2023/0345068 A1 Oct. 26, 2023

(30) Foreign Application Priority Data
Jul. 22, 2020 (JP) .................... 2020-125327

(51) Int. Cl.
*H04N 21/2743* (2011.01)
*G06F 3/14* (2006.01)
*H04N 21/254* (2011.01)

(52) U.S. Cl.
CPC .......... *H04N 21/2743* (2013.01); *G06F 3/14* (2013.01); *H04N 21/254* (2013.01)

(58) Field of Classification Search
CPC ..... H04N 21/2743; H04N 21/254; G06F 3/14
See application file for complete search history.

(56) References Cited

U.S. PATENT DOCUMENTS 8,515,253 B2  8/2013  Cottrell
9,003,147 B2  4/2015  Sakai
(Continued)

FOREIGN PATENT DOCUMENTS

JP   2011072735 A   4/2011
JP   2011516103 A   5/2011
(Continued)

OTHER PUBLICATIONS

International Search Report for related PCT Application No. PCT/JP2021/026978, 4 pages, dated Oct. 12, 2021.
(Continued)

*Primary Examiner* — Jefferey F Harold
*Assistant Examiner* — Alexander Boyd
(74) *Attorney, Agent, or Firm* — Matthew B. Dernier, Esq.

(57) ABSTRACT

A sharing processing section uploads a content image recorded in an image recording device to a distribution server. A display processing section displays a display element indicative of the updated content image. The sharing processing section acquires past distribution record data regarding the uploaded content image. The display processing section displays information regarding past distribution records in association with the display element indicative of the uploaded content image.

7 Claims, 9 Drawing Sheets

(56) References Cited

U.S. PATENT DOCUMENTS

| | | |
|---|---|---|
| 9,776,085 B2 | 10/2017 | Shiraiwa |
| 10,034,032 B2 | 7/2018 | Kunugida |
| 10,071,315 B2 | 9/2018 | Watari |
| 10,255,348 B2 | 4/2019 | Sato |
| 10,335,679 B2 | 7/2019 | Fukuda |
| 10,693,956 B1 | 6/2020 | Green |
| 2009/0208181 A1 | 8/2009 | Cottrell |
| 2010/0269144 A1 | 10/2010 | Forsman |
| 2012/0005628 A1* | 1/2012 | Isozu ................ H04N 21/8153 715/838 |
| 2013/0111512 A1* | 5/2013 | Scellato ............... H04N 21/252 725/14 |
| 2013/0159654 A1 | 6/2013 | Sakai |
| 2014/0364206 A1 | 12/2014 | Shiraiwa |
| 2015/0018094 A1 | 1/2015 | Watari |
| 2017/0105029 A1 | 4/2017 | Kunugida |
| 2017/0154097 A1 | 6/2017 | Sato |
| 2017/0182415 A1 | 6/2017 | Fukuda |
| 2018/0253765 A1 | 1/2018 | Avedissian |
| 2019/0351335 A1 | 11/2019 | Yong |

FOREIGN PATENT DOCUMENTS

| | | |
|---|---|---|
| JP | 2013123537 A | 6/2013 |
| JP | 2015013102 A | 1/2015 |
| JP | 2015016104 B1 | 1/2015 |
| JP | 2015198404 A | 11/2015 |
| JP | 6083546 B1 | 2/2017 |
| JP | 2018198089 A | 12/2018 |
| JP | 2019057289 A | 4/2019 |
| JP | 2020108074 A | 7/2020 |
| WO | 2016067734 A1 | 5/2016 |

OTHER PUBLICATIONS

International Search Report for related PCT Application No. PCT/JP2021/026979, 4 pages, dated Oct. 19, 2021.
International Search Report for corresponding PCT Application No. PCT/JP2021/026977, 4 pages, dated Aug. 31, 2021.
Extended European Search Report for corresponding EP Application No. 21847182.9, 8 pages, dated Apr. 18, 2024.

* cited by examiner

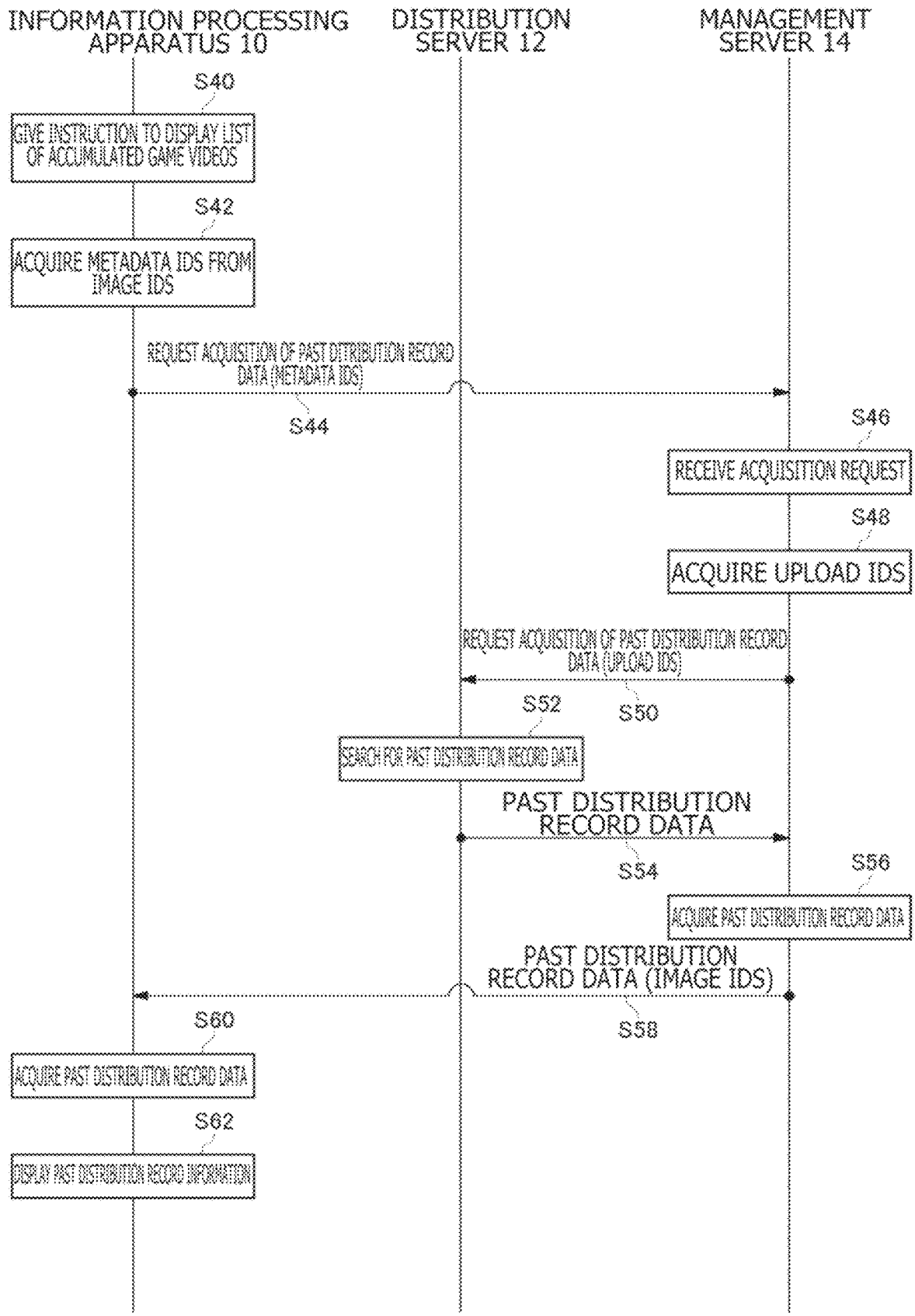

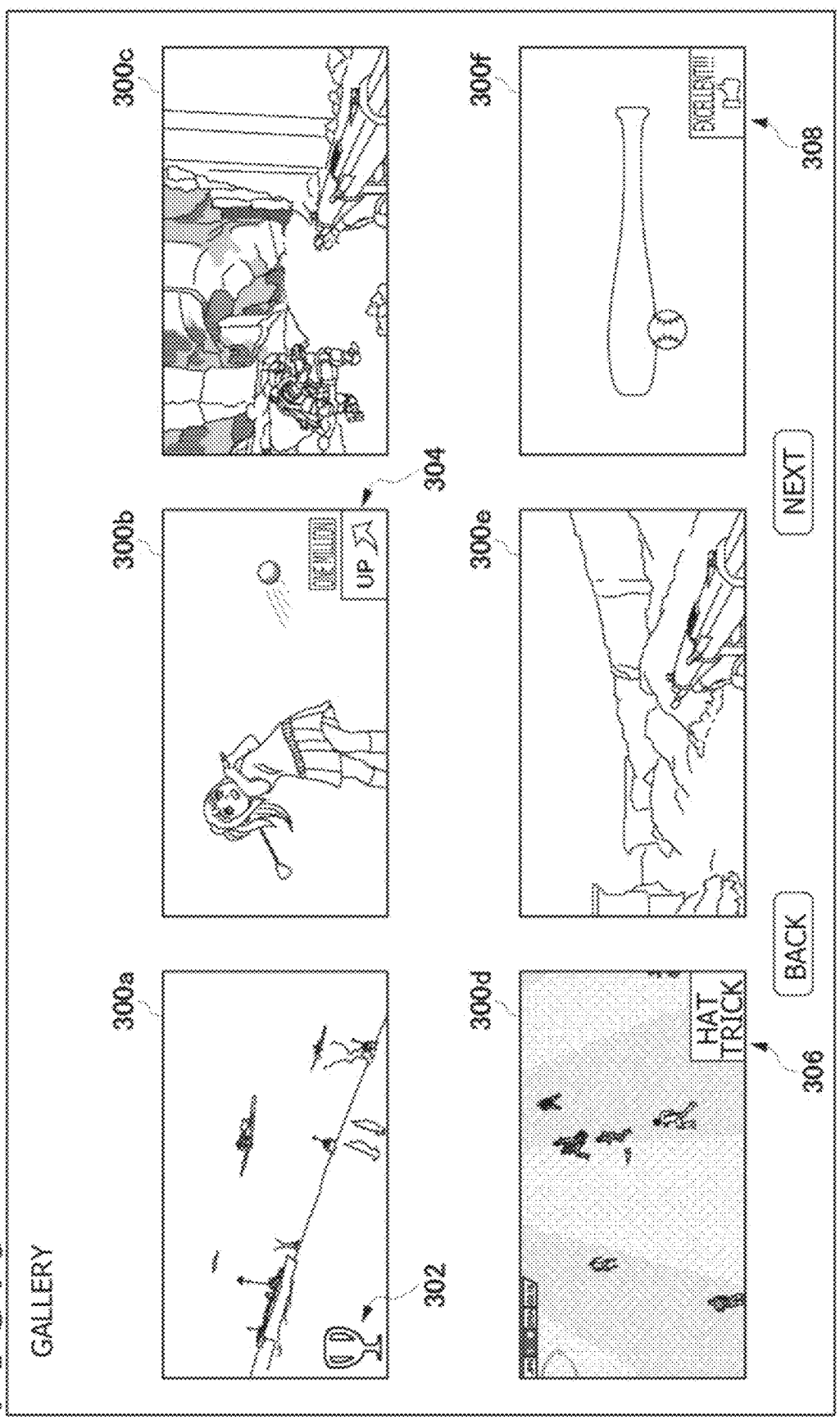

INFORMATION PROCESSING APPARATUS, DISPLAY ELEMENT DISPLAY METHOD, AND MANAGEMENT SERVER

TECHNICAL FIELD

The present disclosure relates to a technology for displaying display elements indicative of uploaded content images.

BACKGROUND ART

There has been a widespread use of services that provide sharing of content images created or captured by users. PTL 1 discloses a distribution server that distributes video data posted by users as well as video data edited by editing servers.
[Citation List] [Patent Literature]
[PTL 1] Japanese Patent Laid-Open No. 2015-198404

SUMMARY

Technical Problem

A user can upload a captured game video to a distribution server that in turn distributes the uploaded video of the game played by the user. When the game video is distributed to a large number of viewing users and is highly rated by them, the motivation of the user to play the game and distribute its video is boosted. In view of this, it has been desired that there be a scheme for users to simply access past distribution records of their uploaded game videos.

It is therefore an object of the present disclosure to implement a scheme for a user to simply verify past distribution records of a content image uploaded by the user to the distribution server.

Solution to Problem

In solving the above problem and according to an embodiment of the present disclosure, there is provided an information processing apparatus connected with a distribution server, including a sharing processing section configured to upload a content image recorded in a recording device to the distribution server, and a display processing section configured to display a display element indicative of the uploaded content image. The sharing processing section acquires past distribution record data regarding the uploaded content image. The display processing section displays information regarding past distribution records in association with the display element indicative of the uploaded content image.

According to another embodiment of the present disclosure, there is provided a display element display method. The method includes a step of uploading a content image recorded in a recording device to a distribution server, a step of acquiring past distribution record data regarding the uploaded content image, a step of displaying a display element indicative of the uploaded content image, and a step of displaying information regarding past distribution records in association with the display element.

According to a further embodiment of the present disclosure, there is provided a management server connected with an information processing apparatus operated by a user and with a distribution server distributing a content image uploaded from the information processing apparatus, the management server including an ID (identifier) acquisition section configured to acquire a combination of an image ID and an upload ID from the information processing apparatus, the image ID being set to the content image by the information processing apparatus, the upload ID being assigned to the uploaded content image by the distribution server, an ID assignment section configured to assign a metadata ID to the combination of the image ID and the upload ID, an ID transmission section configured to transmit the metadata ID to the information processing apparatus, a request reception section configured to receive from the information processing apparatus a request to acquire past distribution record data including the metadata ID, a request transmission section configured to acquire the upload ID from the metadata ID included in the acquisition request, before transmitting to the distribution server a request to acquire the past distribution record data including the upload ID, a data acquisition section configured to acquire the past distribution record data from the distribution server, and a data transmission section configured to transmit the image ID and the past distribution record data to the information processing apparatus.

Where suitable combinations of the above-outlined constituent elements or the above expressions of the present disclosure are converted between different forms such as a method, an apparatus, a system, a recording medium, and a computer program, they still constitute effective embodiments of this disclosure.

BRIEF DESCRIPTION OF DRAWINGS

FIG. 8 is a sequence diagram of processes for displaying information regarding past distribution records.
FIG. 9 is a diagram depicting a list display screen of game videos.

DESCRIPTION OF EMBODIMENTS

In an information processing system as one embodiment of the present disclosure, a user records a video captured of playing a game (i.e., a game video) to a recording device and has the game video uploaded to a distribution server in a suitably timed manner. In turn, the distribution server distributes the uploaded game video to an unspecified large number of viewing users.

The distribution server manages past distribution records such as the number of game video distributions and the number of ratings from viewing users (e.g., number of times the "Like" button has been pressed), and displays the records in association with the game videos on a video-sharing website. A user having uploaded a game video can access the distribution server to verify the distribution records of the game video. In a case where the user has uploaded the game video to multiple distribution servers, it is necessary to access each of the distribution servers for verification.

In the information processing system, an information processing apparatus then acquires, from an external server, the past record data of game video distributions and displays a thumbnail image of each game video in association with information regarding its past distribution records. This allows the distributing user to easily verify the past distribution records of the uploaded game videos without accessing the distribution server. Incidentally, the images that can be uploaded by the user are not limited to the game videos, and content images of other types may also be uploaded. The content images may be both moving images and still images.

Figure 1:
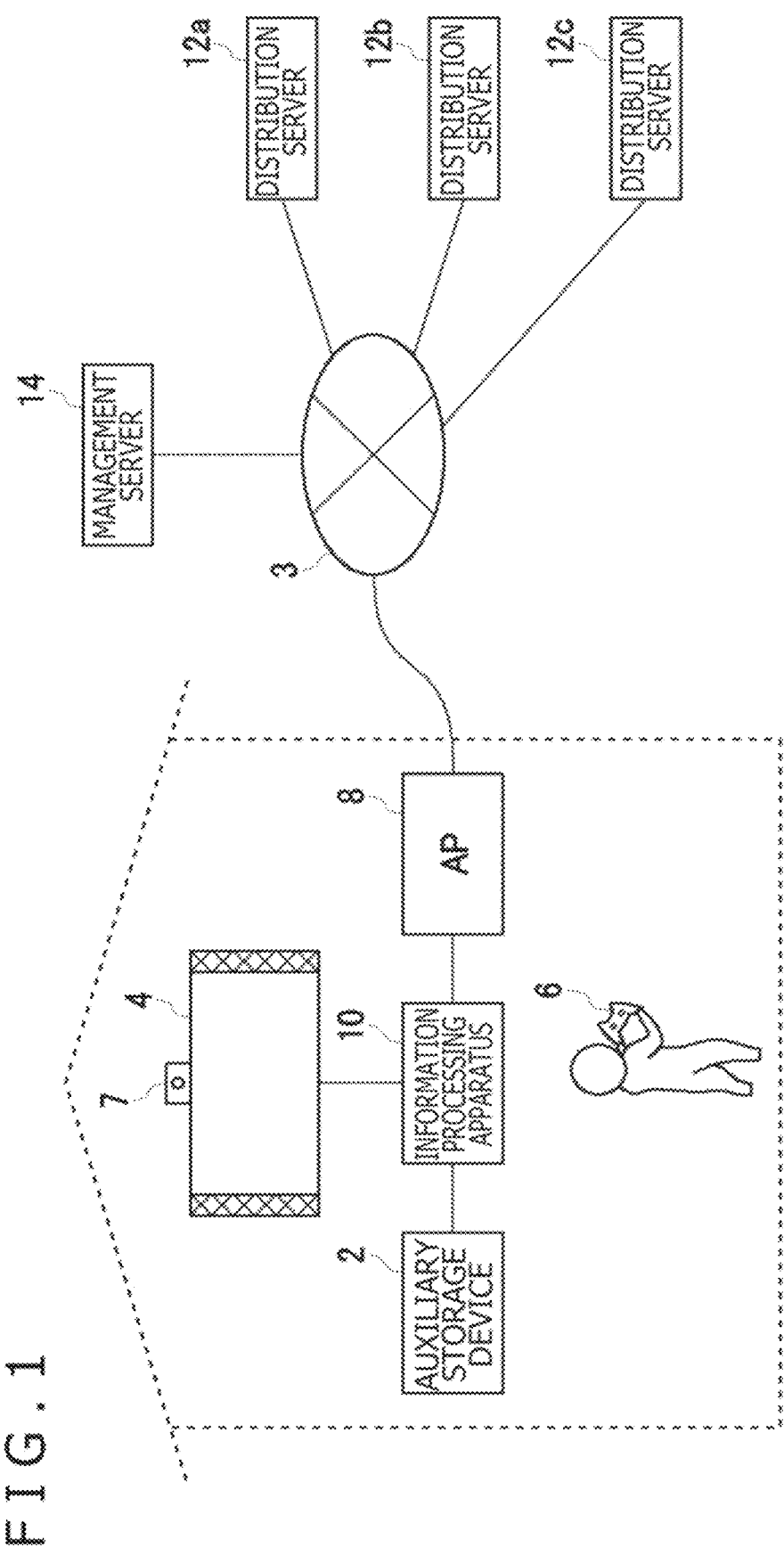
FIG. 1 is a diagram depicting an information processing system as one embodiment of the present disclosure.

FIG. 1 depicts an information processing system 1 as one embodiment of the present disclosure. The information processing system 1 includes an information processing apparatus 10 serving as a user terminal, distribution servers 12a, 12b, and 12c (referred to as "the distribution server 12" hereunder where there needs to be no distinction between them) that distribute content images uploaded by the user, and a management server 14. The information processing system 1 may be configured as an image-sharing system.

An access point (referred to as "AP" hereunder) 8 has the functions of a wireless access point and of a router. The information processing apparatus 10 is connected with the AP 8 in a wired or wireless manner for communicable connection with the distribution server 12 and management server 14 on a network 3.

The information processing apparatus 10 is connected in a wired or wireless manner with an input device 6 operated by the user. The input device 6 outputs information regarding operations performed thereon by the user to the information processing apparatus 10. Upon receipt of the operation information from the input device 6, the information processing apparatus 10 causes the received information to be reflected in the processing of system software and game software, and has the result of the processing output from an output device 4. In the information processing system 1, the information processing apparatus 10 may be a game machine that executes games (i.e., game console), and the input device 6 may be a game controller or like device that supplies the information processing apparatus 10 with the operation information from the user. Note that the input device 6 may alternatively be an input interface such as a keyboard and a mouse.

An auxiliary storage device 2 may be a mass recording device such as an HDD (hard disk drive) or an SSD (solid state drive) used as an internal recording device. Alternatively, the auxiliary storage device 2 may be an external recording device connected with the information processing apparatus 10 by a USB (Universal Serial Bus), for example. The output device 4 may be a television set having a display that outputs images and speakers that output sounds. The output device 4 may be connected with the information processing apparatus 10 either by cable or wirelessly.

A camera 7 used as an imaging device is disposed near the output device 4 and captures images of a space around the output device 4. Whereas FIG. 1 depicts an example in which the camera 7 is mounted on a top of the output device 4, the camera 7 may alternatively be located beside or under the output device 4. In any case, the camera 7 is disposed in a position suitable for imaging the user positioned in front of the output device 4. The camera 7 may be a stereo camera.

The distribution server 12 provides an image-sharing service that distributes the content images uploaded from the information processing apparatus 10. The distribution server 12 distributes the stored content images on demand as requested by viewing users. Although FIG. 1 indicates three distribution servers 12a, 12b, and 12c, it is only sufficient that the number of distribution servers 12 is at least one in the information processing system 1.

The distribution server 12 manages, in the form of metadata, past distribution record data regarding each content image targeted for distribution. The past distribution record data may include various performance data and rating data regarding distributions, such as the total number of distributions, the number of distributions in the most recent week, the number of ratings from viewing users, and comments from viewing users. The distribution server 12 improves the attractiveness of the image-sharing website by creating a popularity ranking of content images using the past distribution record data regarding each of the content images.

The management server 14 acquires the past distribution record data regarding content images upon request from the information processing apparatus 10 and transmits the acquired data to the information processing apparatus 10. In the information processing system 1, the information processing apparatus 10 acquires, via the management server 14, the past distribution record data generated by the distribution server 12. When the management server 14 permits exchanges of the past distribution record data between the distribution server 12 and the information processing apparatus 10, it is possible to implement an image-sharing system that flexibly deals with changes in specifications of the distribution server 12, for example.

Figure 2:
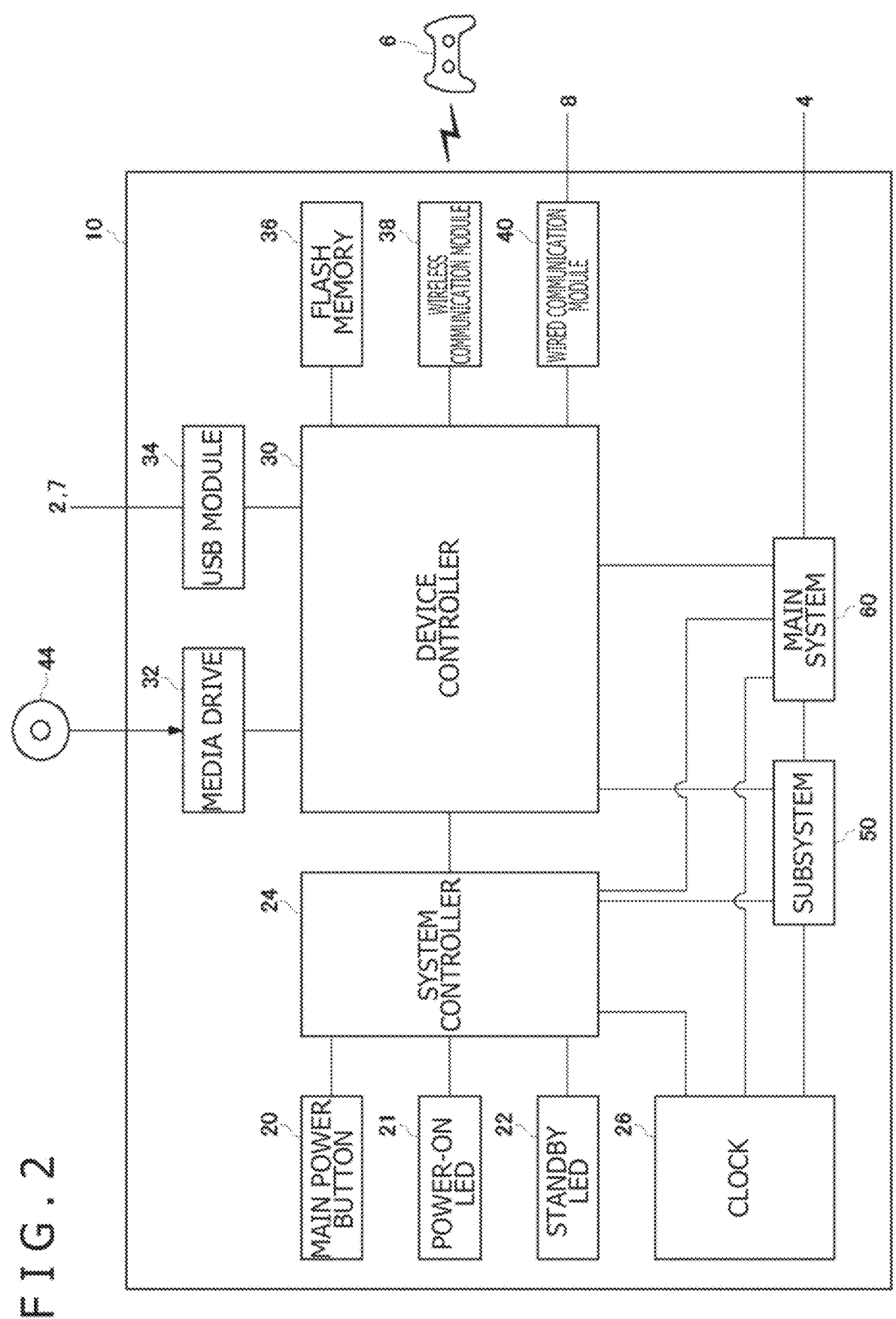
FIG. 2 is a diagram depicting a hardware configuration of an information processing apparatus.

FIG. 2 depicts a hardware configuration of the information processing apparatus 10. The information processing apparatus 10 is configured with a main power button 20, a power-ON LED (light emitting diode) 21, a standby LED 22, a system controller 24, a clock 26, a device controller 30, a media drive 32, a USB module 34, a flash memory 36, a wireless communication module 38, a wired communication module 40, a subsystem 50, and a main system 60.

The main system 60 includes a main CPU (Central Processing Unit), a memory and a memory controller that constitute a main storage device, and a GPU (Graphics Processing Unit). The GPU is used primarily for arithmetic processing of game programs. The main CPU has functions of activating system software, and in an environment provided by the system software, of executing the game program installed in the auxiliary storage device 2. The subsystem 50 includes a sub-CPU, and a memory and a memory controller that include a main storage device but does not have a GPU.

The main CPU has the function of executing the game program installed in the auxiliary storage device 2 or in a ROM medium 44, whereas the sub-CPU has no such function. However, the sub-CPU has functions of accessing the auxiliary storage device 2 and of transmitting and receiving data to and from the management server 14. The sub-CPU is configured solely with such limited processing functions and thus operates on less power than the main CPU. These functions of the sub-CPU are activated when the main CPU is in a standby state.

The main power button 20 is an input part to which the user performs operation input. Located on a front surface of the housing of the information processing apparatus 10, the main power button 20 is operated to turn on and off the supply of power to the main system 60 of the information processing apparatus 10. The power-ON LED 21 is lit when the main power button 20 is turned on. The standby LED 22 is lit when the main power button is turned off. The system controller 24 detects the pressing of the main power button 20 by the user.

The clock 26 is a real-time clock that generates current date and time information. The clock 26 supplies the generated information to the system controller 24, subsystem 50, and main system 60.

The device controller 30 is configured as an LSI (Large-Scale Integrated Circuit) which, like a Southbridge, mediates transfers of information between configured devices. As illustrated, the device controller 30 is connected with such devices as the system controller 24, the media drive 32, the USB module 34, the flash memory 36, the wireless communication module 38, the wired communication module 40, the subsystem 50, and the main system 60. The device controller 30 absorbs differences in electrical characteristics and data transfer rates of the individual devices and thereby controls a timing of data transfers therebetween.

The media drive 32 is a drive device which, loaded with a ROM medium 44 on which application software such as games and their license information are recorded, drives the loaded ROM medium 44 to read programs and data therefrom. The ROM medium 44 is a read-only recording medium such as an optical disk, a magneto-optical disk, or a Blu-ray disk.

The USB module 34 is a module connected with an external device by a USB cable. The USB module 34 may also be connected with the auxiliary storage device 2 and the camera 7 by the USB cable. The flash memory 36 is an auxiliary storage device that constitutes internal storage. The wireless communication module 38 communicates wirelessly with the input device 6, for example, by using communication protocols such as the Bluetooth (registered trademark) protocol and the IEEE 802.11 protocol. The wired communication module 40 communicates with an external device in a wired manner and is connected with the network 3 via the AP 8, for example.

The information processing apparatus 10 of the embodiment has functions of recording a video of the game played by the user to the auxiliary storage device 2 and of uploading the recorded game video to the distribution server 12 for sharing purpose. In the ensuing paragraphs, the function of recording a game video will be explained primarily with reference to FIG. 3, and the function of sharing the game video will be described mainly with reference to FIG. 5. In these drawings, the elements described as functional blocks for performing various processes of the information processing apparatus 10 may be configured by hardware using circuit blocks, memories, and other LSIs, or implemented by software using programs loaded into memory, for example. Thus, it will be understood by those skilled in the art that these functional blocks may be implemented by hardware alone, by software alone, or by a combination of both in diverse forms and are not limited to any of such forms.

Figure 3:
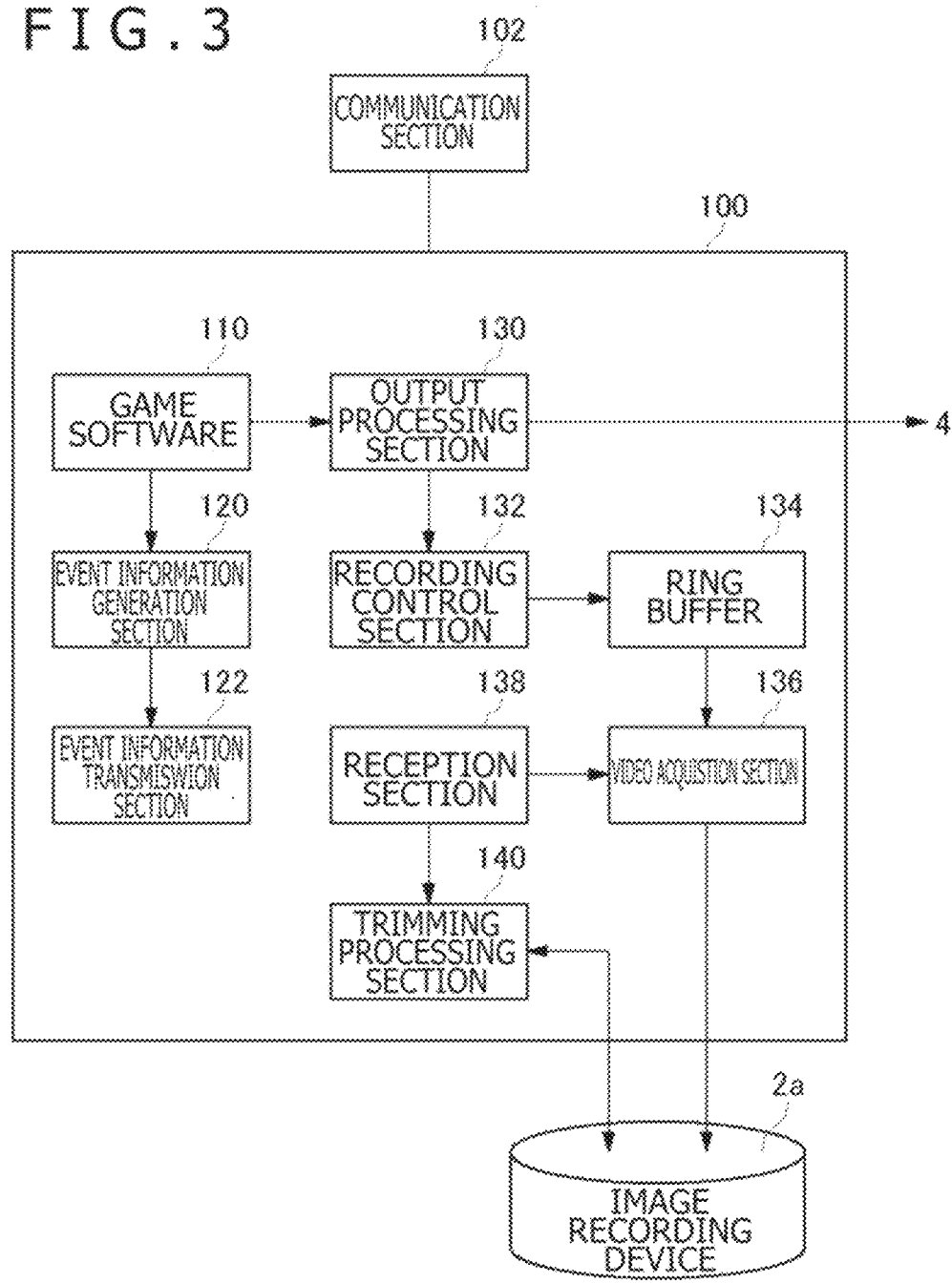
FIG. 3 is a diagram depicting functional blocks of the information processing apparatus.

FIG. 3 depicts the functional blocks for primarily implementing the game video recording function of the information processing apparatus 10. The information processing apparatus 10 includes a processing section 100 and a communication section 102. The processing section 100 includes game software 110, an event information generation section 120, an event information transmission section 122, an output processing section 130, a recording control section 132, a ring buffer 134, a video acquisition section 136, a reception section 138, and a trimming processing section 140. The reception section 138 receives information of the operations on the input device 6 performed by the user. An image recording device 2a may be formed by a partial recording region of the auxiliary storage device 2.

The game software 110 includes at least a game program, image data, and audio data. Given the operation information of the input device 6 from the user, the game program performs the arithmetic processing for moving a player character in a virtual space. The output processing section 130 generates image data and audio data for the ongoing game in the game software 110, and causes the output device 4 to output the generated data. The output processing section 130 may include a GPU (Graphics Processing Unit) for carrying out rendering processing.

In the information processing apparatus 10 of the embodiment, the output processing section 130 generates the image data and audio data of the game, causes the output device 4 to output the generated image and audio data, and supplies the generated data to the recording control section 132 as well. In the ensuing paragraphs, the image data and audio data of the game will be generically referred to as "game video" or "game video data." The information processing apparatus 10 has a function of recording in the background the game video generated by the output processing section 130. The recording control section 132 records the game video data to the ring buffer 134.

The ring buffer 134 is configured by setting a starting address and an ending address of a recording region in the auxiliary storage device 2. The ring buffer region may be set beforehand at the time of shipment of the information processing apparatus 10. The recording control section 132 records to the ring buffer 134 the game video data output from the output processing section 130 along with time information (i.e., timestamp).

The recording control section 132 records to the ring buffer 134 the game video data at a predetermined sequence of addresses from the starting address, and, when the ending address is reached, starts overwriting the starting and subsequent addresses. The process is then repeated. For example, the ring buffer 134 is set to record a 60-minute game video, with a timestamp attached to the recorded game video. When the game video is recorded to the ring buffer 134 in the background, the user may clip desired scenes from the play videos recorded up until 60 minutes ago and save the clipped scenes into the image recording device 2a. As will be discussed later, the user may upload the saved game videos to the distribution server 12.

In a case where a predetermined event occurs while the game is underway, the game program outputs an event code indicative of the event that has taken place. The event information generation section 120 acquires the event code from the game software 110 and generates event information by attaching to the event code the time information (timestamp) indicative of the point in time at which the event occurred.

Game developers may place various events into the game. Each of the events is assigned an event code. The game program may attach game data indicative of a state of the game upon occurrence of the event to the event code representing the event before outputting the event code along with the game data. Here, the game data includes information regarding the location where the event occurred and an opponent in the game. When a battle with an enemy boss has started, for example, the game program may attach the game data indicative of the battle location and the enemy boss's character ID to the event code indicating the start of the battle before outputting the event code together with the game data. Upon acquisition of the event code and the game data, the event information generation section 120 generates the event information by attaching the time information indicative of the point in time at which the event took place.

The event information generation section 120 supplies the generated event information to the event information transmission section 122. In turn, the event information transmission section 122 transmits the supplied event information to the management server 14 via the communication section 102. For this purpose, the management server 14 collects the event information regarding all events that occurred during the game play.

During game execution, the reception section 138 receives recording-related instructions from the user. When the user operates a suitable button on the input device 6, the reception section 138 receives the operation as a recording instruction causing the video acquisition section 136 to save a game video (video clip) of up to 60 minutes from the ring buffer 134 into the image recording device 2a. Note that the time of the video clip to be recorded may be set beforehand by the user within a maximum time range of 60 minutes. Note that the user may operate the input device 6 to set a start point of the game video to be saved, and, with the desired game scene ended, again operate the input device 6 to set an end point of the game video. The video acquisition section 136 may then save the game video defined by the start point and the end point into the image recording device 2a. At the time the game video is saved into the image recording device 2a, the video acquisition section 136 sets an image ID identifying the saved game video. An image ID is always set to uniquely identify every game video saved into the image recording device 2a.

After playing the game, the user may edit the game video recorded in the image recording device 2a. For example, the user may operate the input device 6 to set a starting point and an ending point of the scene desired to be saved from a 60-minute game video recorded in the image recording device 2a.

Figure 4:
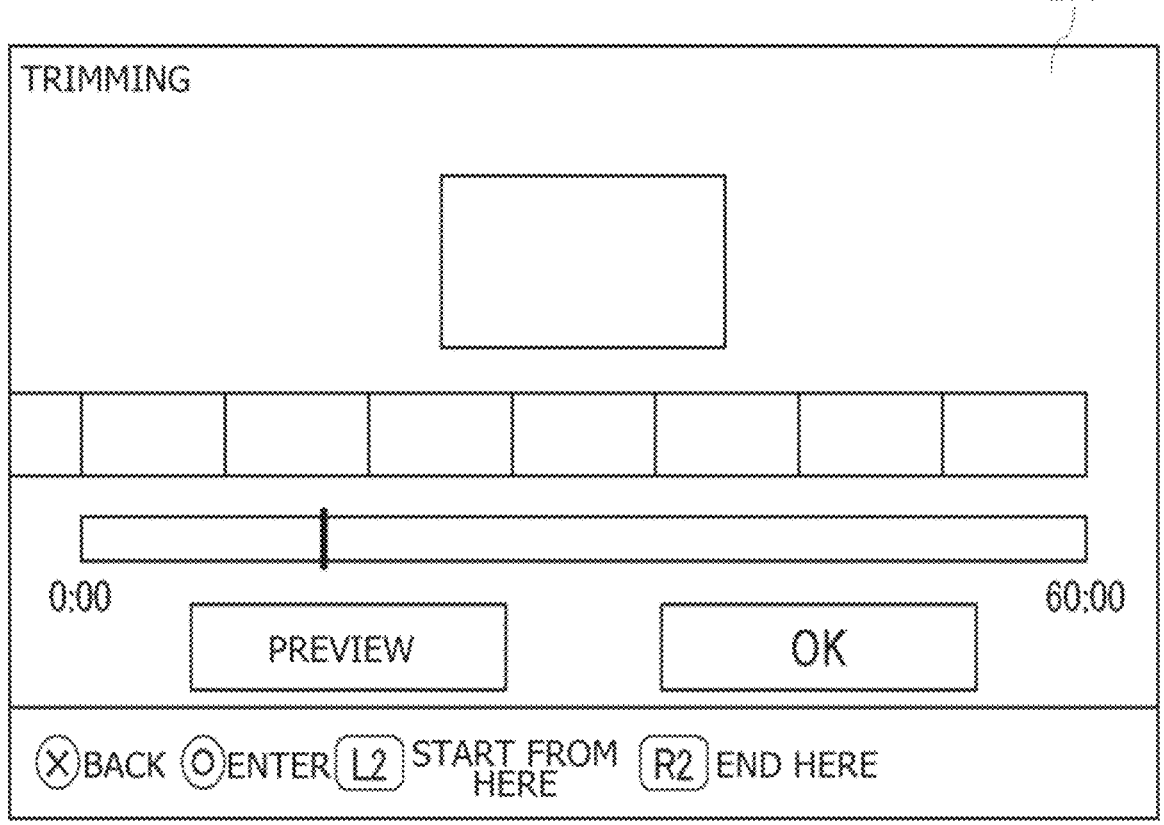
FIG. 4 is a diagram depicting a trimming edit screen.

FIG. 4 depicts a trimming edit screen 200. On the trimming edit screen 200, the user may edit the game video saved in the image recording device 2a. For example, in a case where there is an upper time limit set for videos that can be uploaded to the distribution server 12, the user may operate the input device 6 to designate the starting point and the ending point for clipping a game video to a length suitable for upload. When the reception section 138 receives the designated starting point and the ending point from the user, the trimming processing section 140 clips the game video recorded in the image recording device 2a to the length of time defined by the starting point and the ending point, and overwrites the image recording device 2a with the clipped game video. At this time, the image ID remains unchanged. It is to be noted that regardless of doing or not doing the upload, the user may edit the game video in order to clip a desired play scene.

As described above, the user can save the edited game video into the image recording device 2a. The user may then upload the game video saved in the image recording device 2a to the distribution server 12 for sharing with other viewing users.

Figure 5:
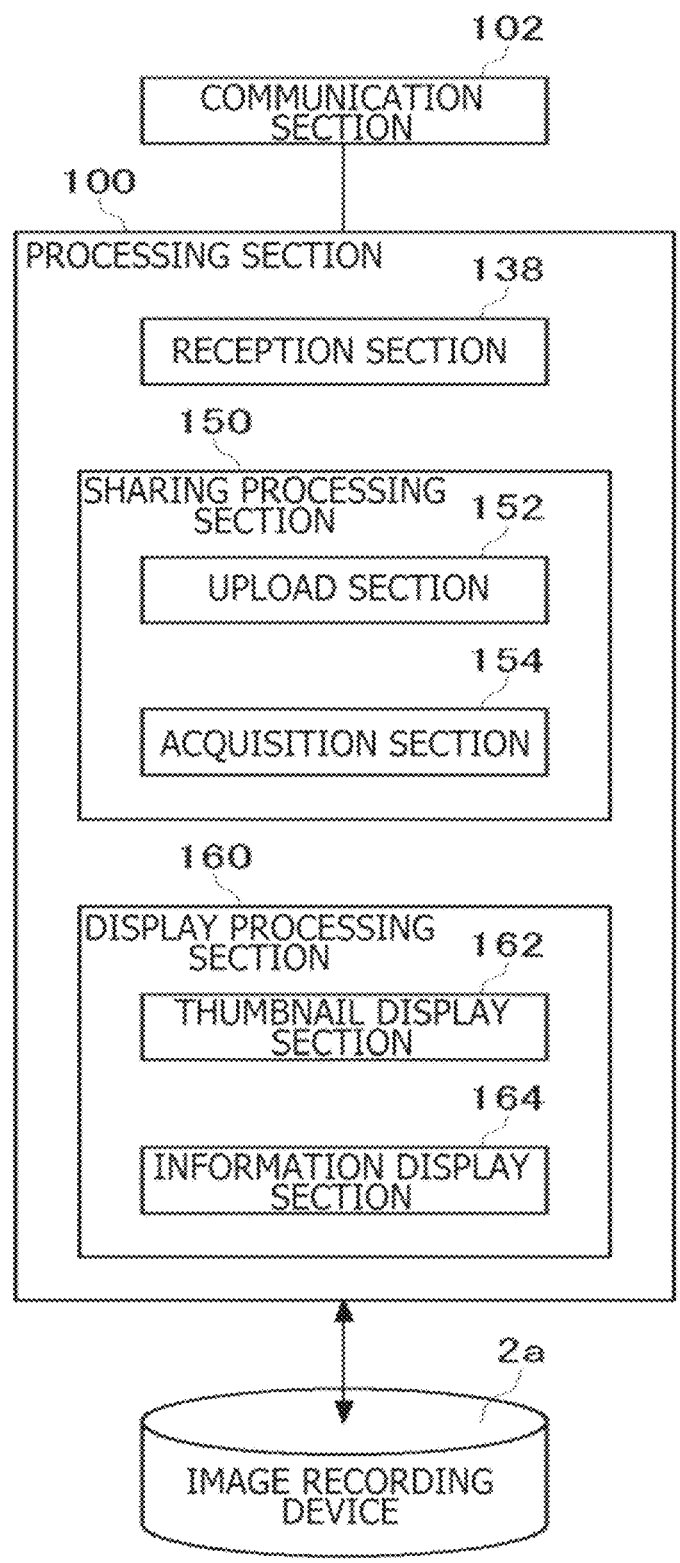
FIG. 5 is a diagram depicting other functional blocks of the information processing apparatus.

FIG. 5 depicts the functional blocks of the information processing apparatus 10 for implementing primarily the function of sharing game videos. The information processing apparatus 10 includes the processing section 100 and the communication section 102. The processing section 100 includes the reception section 138, a sharing processing section 150, and a display processing section 160. The sharing processing section 150 includes an upload section 152 and an acquisition section 154. The display processing section 160 includes a thumbnail display section 162 and an information display section 164. The reception section 138 receives the operation information of the input device 6 from the user.

The user uploads the game video from an upload screen to the distribution server 12. Specifically, on the upload screen, the user selects the game video to be uploaded and a desired distribution server 12. This causes the upload section 152 to upload the game video to the distribution server 12.

Figure 6:
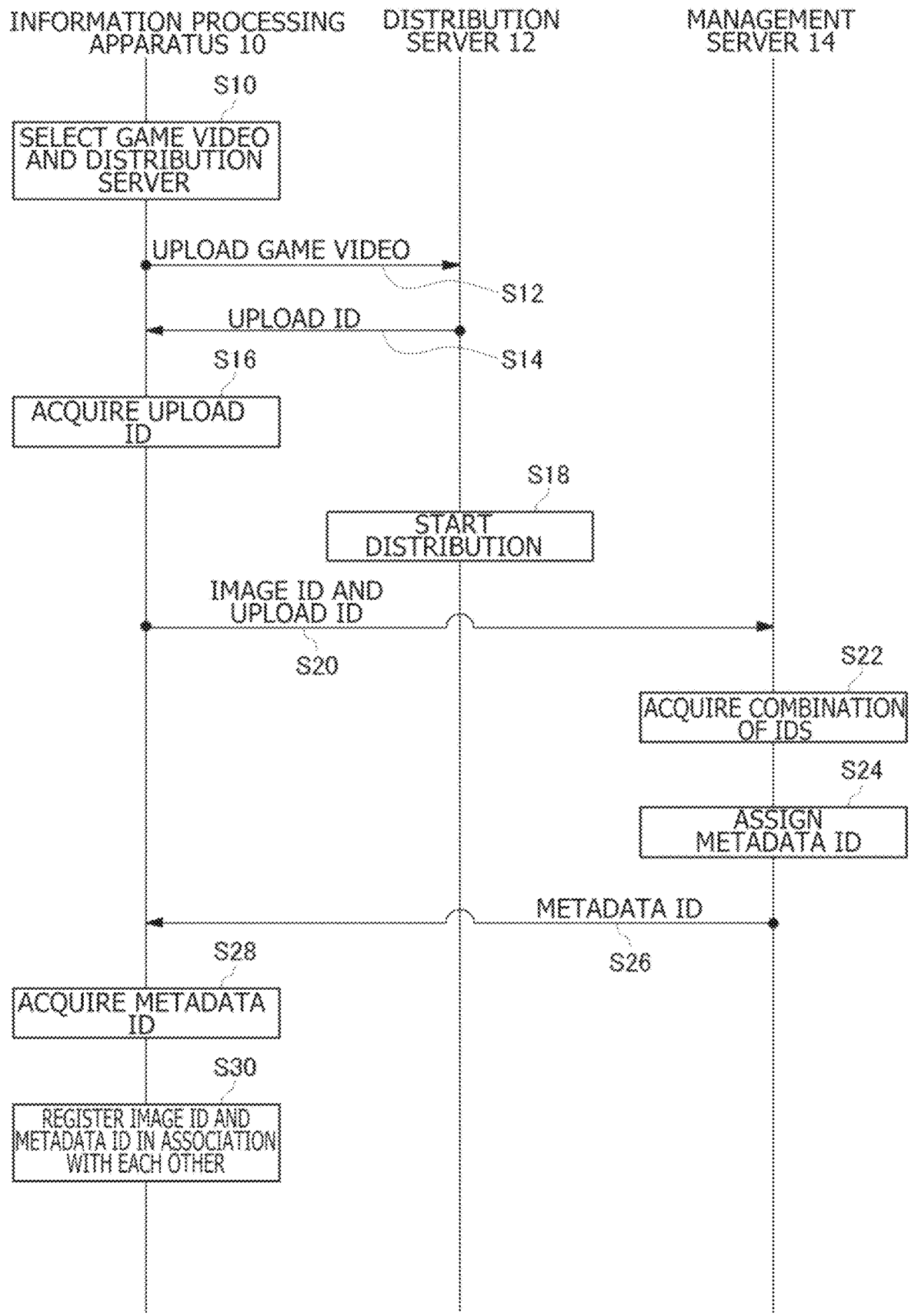
FIG. 6 is a sequence diagram of processes for uploading a game video.

FIG. 6 is a sequence diagram of processes for uploading a game video. When the user selects the game video to be uploaded and the distribution server 12 to serve as the upload destination, the reception section 138 receives the operations of selecting the game video and the distribution server 12 (S10). The upload section 152 uploads the game video to the selected distribution server 12 (S12).

Upon acquiring the game video from the information processing apparatus 10, the distribution server 12 assigns an upload ID to the acquired game video, transmits the upload ID to the information processing apparatus 10 (S14), and starts distributing the game video (S18). Starting the distribution here means to bring about a state in which viewing users accessing the distribution server 12 are allowed to view the game video in question. When the distribution server 12 starts distributing the game video, the game video is shared. The upload ID may include information identifying the content to be distributed by the distribution server 12 (i.e., distributed content ID) in addition to the information identifying the distribution server 12.

In the information processing apparatus 10, the upload section 152 acquires the upload ID from the distribution server 12 (S16). The upload section 152 thereupon transmits to the management server 14 a combination of the image ID of the uploaded game video and the upload ID sent from the distribution server 12 (S20).

Figure 7:
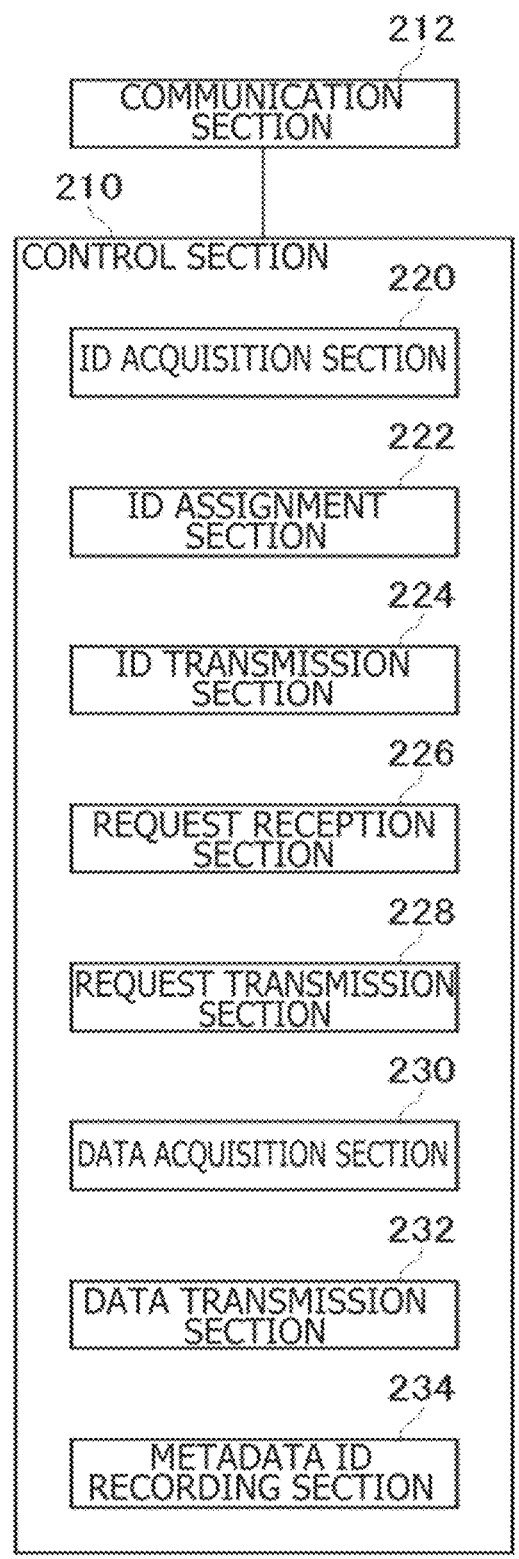
FIG. 7 is a diagram depicting functional blocks of a management server.

FIG. 7 depicts the functional blocks of the management server 14. The management server 14 includes a control section 210 and a communication section 212. The control section 210 includes an ID acquisition section 220, an ID assignment section 222, an ID transmission section 224, a request reception section 226, a request transmission section 228, a data acquisition section 230, a data transmission section 232, and a metadata ID recording section 234.

In FIG. 7, the elements described as the functional blocks for performing various processes of the management server 14 may be configured by hardware using circuit blocks, memories, and other LSIs, or implemented by software using programs loaded into memory, for example. Thus, it will be understood by those skilled in the art that these functional blocks may be implemented by hardware alone, by software alone, or by a combination of both in diverse forms and are not limited to any of such forms.

In the management server 14, the ID acquisition section 220 acquires the combination of the image ID and the upload ID from the information processing apparatus 10, the image ID being set to the game video by the information processing apparatus 10, the upload ID being assigned to the uploaded game video by the distribution server 12 (S22). The ID assignment section 222 assigns a metadata ID to the combination of the image ID and upload ID, and records the assigned metadata ID to the metadata ID recording section 234 (S24). At the same time, the ID transmission section 224 transmits the assigned metadata ID to the information processing apparatus (S26). In the information processing apparatus 10, the acquisition section 154 acquires, from the management server 14, the metadata ID assigned to the combination of the image ID and upload ID (S28), and records the image ID and the metadata ID in association with each other to the image recording device 2a (S30).

In the manner described above, the processes of uploading the game video are completed. In response to requests from viewing users, the distribution server 12 distributes the uploaded game video to the requesting users. The distribution server 12 manages the past distribution records such as the number of game video distributions and the number of ratings from viewing users, and displays the records in association with the game video. The distribution server 12 may create a popularity ranking of content images using the past distribution record data regarding each of the content images. This allows the viewing users accessing the distribution server 12 to know popular content images. For example, in a case where it is desired to view videos related to the game of interest, a viewing user may input the name of the game to a search service offered by the distribution server 12. In turn, the distribution server 12 may be arranged to display thumbnails of multiple distributed videos in decreasing order of the number of distributions.

The user who has uploaded the game video can verify the past distribution records of the uploaded game video by accessing the distribution server 12. For some users, however, it may feel tedious having to perform operations to access the distribution server 12. In a case where one game video is arranged to be distributed from multiple distribution servers 12, it is necessary to access each of the distribution servers 12 to verify the past distribution records. In view of this, the information processing system 1 provides a scheme in which users can easily verify the past distribution records of their uploaded game videos.

FIG. 8 is a sequence diagram of processes for displaying information regarding past distribution records. Explained hereunder is a case in which the user displays a list of game videos saved in the image recording device 2a. In displaying the list of the videos, the information processing apparatus 10 acquires past distribution record data, and displays information regarding the acquired past distribution records in association with display elements indicative of the game videos (e.g., thumbnail images). This allows the user to verify the past distribution record information without operating the input device 6 to access the distribution server 12.

When the user gives an instruction to display a list of the game videos accumulated in the image recording device 2a, the reception section 138 receives the instruction to display the game video list (S40). For example, in a case where there are six display elements (thumbnail images) displayed on a screen of the output device 4, the thumbnail display section 162 in the display processing section 160 determines the image IDs of the six game videos and acquires the metadata IDs associated with the six image IDs from the image recording device 2a (S42). Incidentally, in a case where one game video has been uploaded to multiple distribution servers 12, the image ID of the game video may be associated with multiple metadata IDs.

The thumbnail display section 162 supplies the acquired multiple metadata IDs to the sharing processing section 150. The acquisition section 154 transmits to the management server 14 a request to acquire the past distribution record data including the multiple metadata IDs (S44).

In the management server 14, the request reception section 226 receives from the information processing apparatus 10 the request to acquire the past distribution record data including the metadata IDs (S46). The metadata ID recording section 234 records the metadata IDs assigned to the image IDs and to the upload IDs. By referencing the recorded content in the metadata ID recording section 234, the request transmission section 228 acquires the upload IDs from the metadata IDs included in the received acquisition request (S48). As described above, each upload ID includes the information identifying the distribution server 12. The request transmission section 228 identifies the distribution servers 12 from the upload IDs and transmits to each identified distribution server 12 a request to acquire the past distribution record data including the upload ID (S50).

Upon acquiring the request to acquire the past distribution record data, the distribution server 12 extracts information included in the upload ID and identifying the distributed content (i.e., distributed content ID), and searches for the past distribution record data regarding the identified distributed content (S52). The distribution server 12 transmits the past distribution record data regarding the distributed content to the management server 14 (S54).

In the management server 14, the data acquisition section 230 acquires the past distribution record data sent from the distribution servers 12 (S56). The data transmission section 232 transmits to the information processing apparatus 10 the past distribution record data in association with the image IDs (S58).

In the information processing apparatus 10, the acquisition section 154 acquires the past distribution record data associated with the image IDs (S60) and supplies the acquired data to the display processing section 160. This allows the display processing section 160 to display the information regarding the past distribution records generated from the past distribution record data in association with the display elements indicative of the game videos (S62).

FIG. 9 depicts an exemplary list display screen of the game videos saved in the image recording device 2a. The list display screen is also called the gallery screen. The thumbnail display section 162 displays six display elements indicative of six game videos on this gallery screen. The number of display elements displayed on the gallery screen may be determined as desired by the user. The information display section 164 displays information regarding past distribution records in association with the display elements indicative of the uploaded game videos. Here, thumbnail images 300a, 300b, 300c, 300d, 300e, and 300f are displayed as the display elements representing the game videos.

Since the gallery screen displays the thumbnail images 300 of the game videos saved in the image recording device 2a, there may coexist on the screen the thumbnail images 300 of the uploaded game videos and those of the game videos not uploaded. In the example in FIG. 9, in the thumbnail images 300, the thumbnail images 300b and 300f represent the uploaded game videos.

The information display section 164 displays past distribution record information 304 indicative of the number of distributions in association with the thumbnail image 300b. In this example, the past distribution record information 304 indicates that the number of distributions of the game video represented by the thumbnail image 300b has exceeded one million. Further, the information display section 164 displays, in association with the thumbnail image 300f, past distribution record information 308 indicating that a large number of high ratings have been received from viewing users. Viewing the past distribution record information 304 and 308 allows the user easily to verify the past distribution records and to have a growing motivation to play games and distribute their videos.

The information display section 164 may display the best information out of the various past distribution record data. Besides presenting the information regarding outstanding past distribution records, the information display section 164 may also display information regarding not-so-good past distribution records. Verifying such diverse information regarding the past distribution records allows the user to analyze the view tendency of viewing users, for example.

Also, the information display section 164 may display, in association with the thumbnail images 300a and 300d, information regarding the events included in the game videos. As described above, the event information transmission section 122 transmits the event information generated during game play to the management server 14. Consequently, when the start time and end time of a given game video have become known to the management server 14, the management server 14 can identify the event generated within the game video. In this example, the information display section 164 displays event information 302 indicating the acquisition of a trophy as a virtual prize in association with the thumbnail image 300a, and event information 306 indicative of the occurrence of a hat trick in association with the thumbnail image 300d.

As described above, when the thumbnail display section 162 displays the thumbnail images 300 of the game videos saved in the image recording device 2a, the information display section 164 displays the information regarding the past distribution records or the information related to events in association with the thumbnails. Viewing such information enables the user to have a growing motivation to play games.

The present disclosure has been described above in conjunction with a specific embodiment. It is to be understood by those skilled in the art that suitable combinations of the constituent elements and of various processes of the embodiment described above as examples will lead to further variations of the present disclosure and that such variations also fall within the scope of this disclosure.

For example, the management server 14 may have the comments from viewing users included in the past distribution record data to be transmitted. In this case, the information display section 164 may display the viewing users' comments for the user to read in association with the thumbnail images 300.

INDUSTRIAL APPLICABILITY

The present disclosure can be applied to the techniques for presenting display elements indicative of uploaded content images.

REFERENCE SIGNS LIST

1: Information processing system
2a: Image recording device
10: Information processing apparatus
12a, 12b, 12c: Distribution server
14: Management server
100: Processing section
102: Communication section
110: Game software
120: Event information generation section
122: Event information transmission section
130: Output processing section
132: Recording control section
134: Ring buffer
136: Video acquisition section
138: Reception section
140: Trimming processing section
150: Sharing processing section
152: Upload section
154: Acquisition section
160: Display processing section
162: Thumbnail display section
164: Information display section
210: Control section
212: Communication section
220: ID acquisition section
222: ID assignment section
224: ID transmission section
226: Request reception section
228: Request transmission section
230: Data acquisition section
232: Data transmission section
234: Metadata ID recording section

The invention claimed is:

1. An information processing apparatus connected with a distribution server and a management server, comprising:
   a sharing processing section configured to upload a plurality of content images recorded in a recording device to the distribution server; and
   a display processing section configured to display a respective display element indicative of a corresponding one of the plurality of uploaded content images, wherein:
   the sharing processing section acquires past distribution record data regarding one or more of the plurality of uploaded content images,
   the display processing section displays information regarding past distribution records in association with one or more of the respective display elements indicative of the corresponding one or more of the plurality of uploaded content images,
   the display processing section displays information regarding one or more events included in one or more of the plurality of uploaded content images in association with the one or more respective display elements, and
   upon acquiring from the distribution server an upload identifier assigned to the uploaded content image, the sharing processing section transmits a combination of the upload identifier and an image identifier to the management server, the image identifier being set to the content image by the recording device, the sharing processing section further acquiring, from the management server, a metadata identifier assigned to the combination of the image identifier and the upload identifier.

2. The information processing apparatus according to claim 1, wherein the display processing section displays a thumbnail image of the content image as the display element.

3. The information processing apparatus according to claim 1, wherein the sharing processing section records the image identifier and the metadata identifier in association with each other to the recording device.

4. The information processing apparatus according to claim 3, wherein
   the display processing section acquires the metadata identifier associated with the image identifier of the content image in the recording device,
   the sharing processing section transmits to the management server a request to acquire the past distribution record data including the metadata identifier, the sharing processing section further acquiring the past distribution record data from the management server, and
   the display processing section displays information generated from the past distribution record data and related to the past distribution records in association with the display element indicative of the content image.

5. A display element display method for displaying a display element indicative of a content image, the method comprising:
- uploading a plurality of content images recorded in a recording device to a distribution server;
- acquiring past distribution record data regarding one or more of the plurality of uploaded content images;
- displaying a respective display element indicative of a corresponding one of the plurality of uploaded content images;
- displaying information regarding past distribution records in association with one or more of the respective display elements, wherein the displaying includes displaying information regarding one or more events included in one or more of the plurality of uploaded content images in association with the one or more respective display elements; and
- upon acquiring from the distribution server an upload identifier assigned to the uploaded content image, the acquiring the past distribution record data includes transmitting a combination of the upload identifier and an image identifier to a management server, the image identifier being set to the content image by the recording device, the acquiring the past distribution record data further includes acquiring, from the management server, a metadata identifier assigned to the combination of the image identifier and the upload identifier.

6. A non-transitory, computer readable storage medium containing a computer program, which when executed by a computer, causes the computer to perform a display element display method for displaying a display element indicative of a content image, by carrying out actions, comprising:
- uploading a plurality of content images recorded in a recording device to a distribution server;
- acquiring past distribution record data regarding one or more of the plurality of uploaded content images;
- displaying a respective display element indicative of a corresponding one of the plurality of uploaded content images;
- displaying information regarding past distribution records in association with one or more of the respective display elements, wherein the displaying includes displaying information regarding one or more events included in one or more of the plurality of uploaded content images in association with the one or more respective display elements; and
- upon acquiring from the distribution server an upload identifier assigned to the uploaded content image, the acquiring the past distribution record data includes transmitting a combination of the upload identifier and an image identifier to a management server, the image identifier being set to the content image by the recording device, the acquiring the past distribution record data further includes acquiring, from the management server, a metadata identifier assigned to the combination of the image identifier and the upload identifier.

7. A management server connected with an information processing apparatus operated by a user and with a distribution server distributing a plurality of content images uploaded from the information processing apparatus, the management server comprising:
- an identifier acquisition section configured to acquire a combination of an respective image identifier and a respective upload identifier from the information processing apparatus, the respective image identifier being set to a respective one of the plurality of content images by the information processing apparatus, the respective upload identifier being assigned to the respective one of the plurality of content images by the distribution server;
- an identifier assignment section configured to assign a respective metadata identifier to the combination of the respective image identifier and the respective upload identifier;
- an identifier transmission section configured to transmit the respective metadata identifier to the information processing apparatus;
- a request reception section configured to receive from the information processing apparatus a request to acquire past distribution record data including the respective metadata identifier;
- a request transmission section configured to acquire the respective upload identifier from the respective metadata identifier included in the acquisition request, before transmitting to the distribution server a request to acquire the past distribution record data including the respective upload identifier;
- a data acquisition section configured to acquire the past distribution record data from the distribution server; and
- a data transmission section configured to transmit the respective image identifier and the past distribution record data to the information processing apparatus,
- wherein a display processing section of the information processing apparatus displays a respective display element indicative of a corresponding one of the plurality of uploaded content images and displays information regarding one or more events included in one or more of the plurality of uploaded content images in association with the one or more respective display elements.

* * * * *